(12) United States Patent
Burritt

(10) Patent No.: US 7,843,899 B2
(45) Date of Patent: Nov. 30, 2010

(54) APPARATUS AND METHOD FOR PROVIDING CALL STATUS INFORMATION

(75) Inventor: David Ray Burritt, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 2435 days.

(21) Appl. No.: 10/251,249

(22) Filed: Sep. 20, 2002

(65) Prior Publication Data
US 2004/0057417 A1 Mar. 25, 2004

(51) Int. Cl.
*H04L 12/66* (2006.01)
(52) U.S. Cl. ...................................... 370/352
(58) Field of Classification Search .................. None
See application file for complete search history.

(56) References Cited

U.S. PATENT DOCUMENTS

| | | | |
|---|---|---|---|
| 4,748,656 A | 5/1988 | Gibbs | |
| 5,220,674 A | 6/1993 | Morgan et al. | |
| 5,548,729 A * | 8/1996 | Akiyoshi et al. | 709/222 |
| 6,192,341 B1 | 2/2001 | Becker et al. | |
| 6,421,425 B1 | 7/2002 | Bossi et al. | |
| 6,661,779 B2 | 12/2003 | Johnson et al. | |
| 6,665,375 B1 | 12/2003 | Forlenza et al. | |
| 6,678,659 B1 | 1/2004 | Van Kommer | |
| 6,772,210 B1 * | 8/2004 | Edholm | 709/226 |
| 6,950,501 B1 | 9/2005 | Chaturvedi et al. | |
| 6,975,712 B1 | 12/2005 | Schnarel et al. | |
| 7,113,503 B1 | 9/2006 | Basore | |
| 7,197,120 B2 | 3/2007 | Luehrig et al. | |
| 2002/0057765 A1 | 5/2002 | Hyziak et al. | |
| 2002/0090980 A1 | 7/2002 | Wilcox et al. | |
| 2002/0159574 A1 | 10/2002 | Stogel | |
| 2003/0005076 A1 | 1/2003 | Koch et al. | |
| 2003/0056003 A1 * | 3/2003 | Nakatani | 709/238 |
| 2003/0095650 A1 | 5/2003 | Mize | |
| 2003/0118007 A1 | 6/2003 | Williams | |
| 2003/0214519 A1 | 11/2003 | Smith et al. | |
| 2004/0114730 A1 | 6/2004 | Koch | |
| 2005/0094775 A1 | 5/2005 | Smith et al. | |
| 2005/0094776 A1 | 5/2005 | Haldeman et al. | |
| 2005/0157861 A1 | 7/2005 | Bossemeyer | |
| 2005/0163316 A1 | 7/2005 | Wing | |
| 2005/0201542 A1 | 9/2005 | Wengrovitz | |

* cited by examiner

*Primary Examiner*—Ayaz R Sheikh
*Assistant Examiner*—Blanche Wong
(74) *Attorney, Agent, or Firm*—John C. Moran

(57) ABSTRACT

An apparatus and method use logical network connections to telephones interconnected by the network to obtain the call status information and then to convert the call status information to audio information that is presented to the user.

90 Claims, 12 Drawing Sheets

APPARATUS AND METHOD FOR PROVIDING CALL STATUS INFORMATION

TECHNICAL FIELD

This invention relates to telecommunication switching systems, and in particular, to the provision of call status information.

BACKGROUND OF THE INVENTION

Within the prior art, it is well known to convert visual call status information to audio information so that visually impaired people can receive the call status information. The prior art has provided the audio information for call status information by utilizing special hardware to perform voice synthesis. This hardware was designed specifically for visually impaired users, and consequently, was expensive. In addition, the use as special hardware limited the visually impaired users to a few specific telecommunication terminals.

In addition, the use of specialized equipment resulted in the fact that the users of this equipment were given little if any ability to determine when the audio call status information would be presented and at what frequency. Whereas, the specialized equipment could be modified via programming to provide custom features for individual users; the cost of such provisioning was prohibitive plus the delay normally would be in terms of many months for such customization to be performed by the manufacturer.

SUMMARY OF THE INVENTION

The aforementioned are solved and a technical advance is achieved in the art by an apparatus and method that uses logical network connections to telephones interconnected by the network to obtain the call status information and then to convert the call status information to audio information that is presented to the user.

DETAILED DESCRIPTION

An embodiment provides call status information intended for visual presentation as audio information by establishing a first network connection by a monitor computer to a telecommunication set via a network; receiving call status information intended for visual presentation by the telecommunication set via the network from an endpoint; transmitting call status information intended for visual presentation to the monitor computer by the telecommunication set converting the call status information intended for visual presentation to audio call status information by the monitor computer; and presenting the audio call status information to a user of the telecommunication set. In a first modification of the embodiment the audio call status information is presented to the user of the telecommunication set by transmitting the audio call status information from the monitor computer to the telecommunication set and producing the audio call status information on the telecommunication set. In a second modification of the embodiment, the presenting is done by producing the audio call status information on the monitor computer. In a third modification of the embodiment, the endpoint is a telecommunication switching system. In a fourth modification of the embodiment, the endpoint is another telecommunication set.

Another embodiment provides call status information intended for visual presentation as audio information by establishing a network connection by a telecommunication set to a control computer of the telecommunication switching system via a first network; transmitting call status information intended for visual presentation to the telecommunication set by the control computer via the first network; accessing the call status information intended for visual presentation by monitor computer from the telecommunication set and first network or the control computer and a second network; converting the call status information intended for visual presentation to audio call status information by the monitor computer; and presenting the audio call status information to a user of the telecommunication set by the monitor computer.

Figure 1:
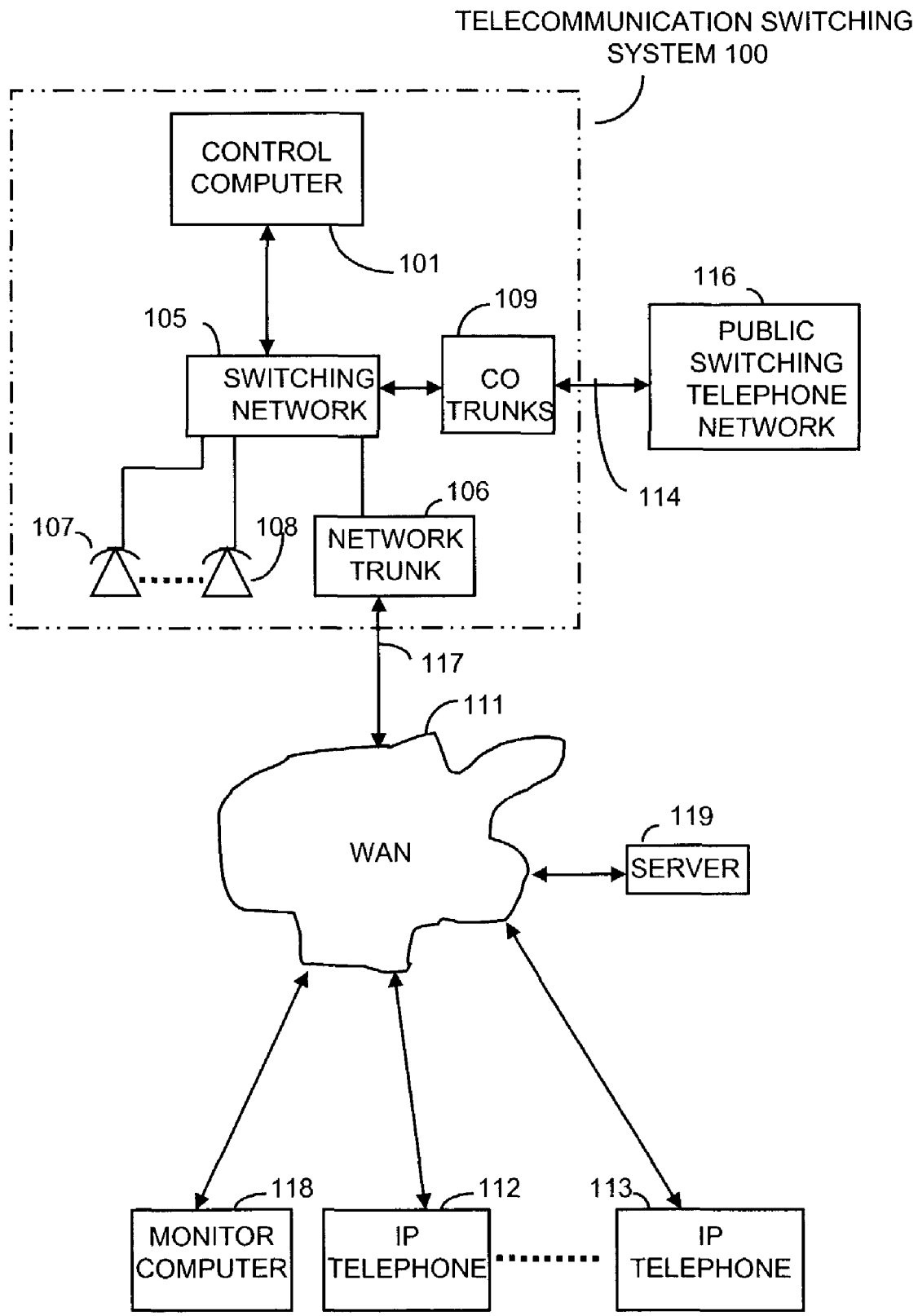
FIG. 1 illustrates, in block diagram form, an embodiment for implementing the invention.
Figure 2:
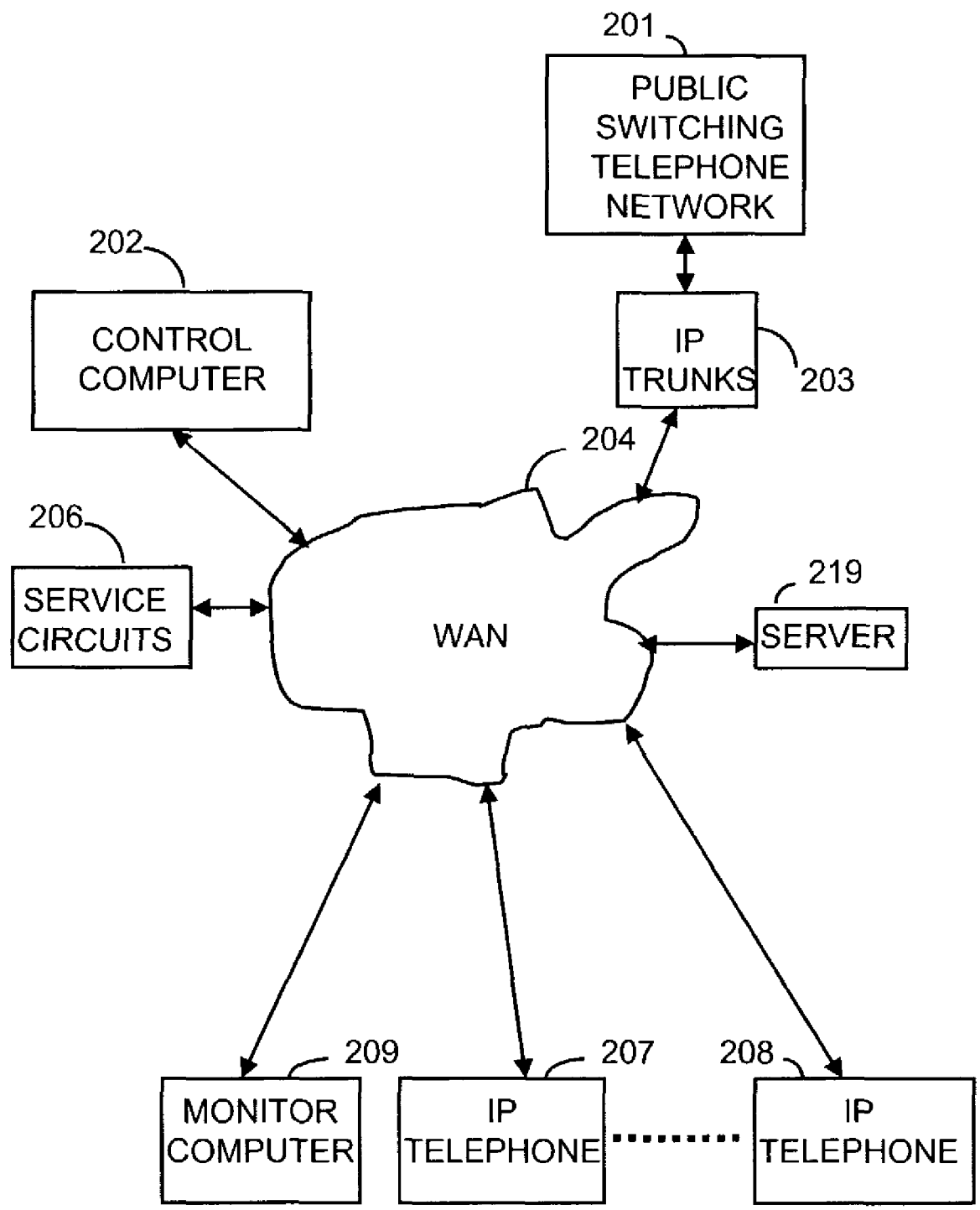
FIG. 2 illustrates, in block diagram form, an embodiment for implementing the invention.

FIGS. 1 and 2 illustrate embodiments for implementing the invention. In FIG. 1, control computer 101 performs the overall control functions for conventional telephones 107-108 and IP telephone sets 112-113. IP telephone sets 112-113 may be IP telephone set 4624 manufactured by Avaya Inc. or a similar telephone set. Switching network 105 performs the switching of not only audio information but also control information to and from computer 101 to the telephone sets. Computer 101 is interconnected to wide area network (WAN) 111 via network trunk 106. Control computer 101 controls the activity of IP telephone sets 112-113 by the transmission of call status information and the receipt of call status information from the IP telephone sets via WAN 111. Control computer 101 controls telephones 107-108 by the transmission of call status and reception of control information via switching network 105. Telephone sets 107-108 can be analog telephone sets, ISDN telephone sets, or proprietary digital protocol telephones sets. Monitor computer 118 is utilized to provide the audio information representing the visual call status signals of one of the IP telephone sets. Monitor computer 118 can be a desktop PC, laptop, a pocket PC, or a hand held unit. In one embodiment of the invention, monitor computer 118 receives the program for implementing the invention via WAN 111 from server 119. Telecommunication switching system 100 is connected to public switching network 116 via CO trunks 109 and trunks 114.

FIG. 2 illustrates another embodiment for implementing the invention. Control computer 202 is controlling the operations of IP telephone sets 207-208 with respect to telecommunication operations by the transmission and reception of control information via WAN 204. Service circuits 206 under the control of control computer 202 provide tone generation, conferencing, etc. via WAN 204 to IP telephone sets 207-208. For a telecommunication call which is only between two IP telephone sets, the IP telephone sets communicate via WAN 204 for the transmission of audio information. Public switching network 201 is interconnected to WAN 204 via IP trunk 203. Monitor computer 209 and server 219 perform similar functions to those performed by monitor computer 118 and server 119 of FIG. 1.

Consider now an example of how monitor computer 118 would provide audio call status information for IP telephone set 112 in one embodiment of the invention. In this embodiment, monitor computer 118 has initially stored in its memory the program and data necessary to provide the audio call status information operations. This is often referred to as monitor computer 118 being a "thick client" by those skilled in the art. To perform its operations, monitor computer 118 needs the IP address for IP telephone set 112. Whereas, it is possible that monitor computer 118 has this information or that it is entered by the user. Another method is for monitor computer 118 to broadcast the telephone number and the password which may be encrypted for IP telephone set 112, along with a request for the corresponding IP address via WAN 111 to all of the IP telephone sets 112-113. IP telephone set 112 is responsive to this request to transmit its IP address to monitor computer 118. In addition, monitor computer 118 could obtain the IP address for IP telephone set 112 by accessing server 119 and obtaining the IP address from server 119 in one embodiment of the invention.

Utilizing the IP address, monitor computer 118 contacts IP telephone set 112 and opens a socket in the TCP/IP control structure of IP telephone set 112 that allows monitor computer 118 to receive the control status information being transmitted from computer 101 via network trunk 106 and WAN 111 to IP telephone set 112. In one embodiment of the invention, monitor computer 118 is responsive to the call status information being transmitted to IP telephone set 112 which will cause different indicators to be lit on IP telephone set 112 to convert this call status information into audio information that monitor computer 118 presents to user 120 via a speaker or headphones attached to monitor computer 118. As will be discussed later, the user of monitor computer 118 has the capability for determining what type of call status information will be presented in audio information and also how often. The ability to tailor the presentation of call status audio information must be built into the capabilities of monitor computer 118 or preprogrammed into the programming data of monitor computer 118 in the thick client implementation.

The advantage of the embodiment just described for presenting audio call status information is quite clear. First, no connection must be made physically to IP telephone set 112 nor does the program of control computer 101 have to be modified in any manner. In the previous example, the embodiment utilized the audio reproduction capability of monitor computer 118 to present the audio call status information to user 120. In another embodiment, monitor computer 118 transmits the audio call status information to IP telephone set 112 via WAN 111 for presentation to user 120. This is accomplished by monitor computer 118 opening a second socket on IP telephone set 112 by a request which IP telephone set 112 recognizes as being a socket through which it will receive audio information. Monitor computer 118 is responsive to the call status information being transmitted to IP telephone set 112, to convert the call status information to audio call status information, and to transmit this audio call status information via the second socket to IP telephone set 112. In response to the audio call status information from monitor computer 118, IP telephone set 112 presents this information to user 120 via the internal CODEC of IP telephone set 112. The output of the CODEC of IP telephone set 112 presents the audio call status information to user 120 in the same audio stream as is being utilized for the actual telecommunication call. Alternatively, IP telephone set 112 could utilize a built-in speaker such as one used as a speaker phone to present this information. Alternately, as is well known to those skilled in the art, IP telephone set 112 could also convert the received audio call status information to information to be presented to user 120 using another conversion technique rather than that used by its CODEC.

In the previous examples, the embodiments described utilize a program and data configuration information stored permanently on monitor computer 118. This information had to be pre-stored on monitor computer 118. There are advantages in utilizing such a software structure-namely such a structure is normally more efficient and yields faster performance. However, the previous embodiments do suffer from the disadvantage of having to have the program and data preinstalled on monitor computer 118 before the audio call status information operations can be performed. In the embodiments to be described in this section, the only software that must be pre-installed on monitor computer 118 is a web browser. When the user of monitor computer 118 wishes to perform the audio call status operations with IP telephone set 112, the user first accesses server 119 utilizing the web browser and obtains from server 119 a JAVA applet or its equivalent Microsoft ActiveX Control entity. The JAVA applet is a JAVA program that will be installed on monitor computer 118 that will perform the operations of establishing the first socket on IP telephone set 112 in order to obtain the call status information and, if desired, to establish the second socket that is utilized to present the audio call status information to the user. An operation where a computer starts out with only a browser and downloads a JAVA applet to execute certain functions and relies on other programs already installed on monitor computer 118 is commonly referred to as a "thin client" implementation by those skilled in the art. The JAVA applet would utilize the audio reproduction capabilities of software already installed on monitor computer 118 via the browser to present the audio call status information to the user. The audio files that would be utilized for the audio call status information would be, however, downloaded from server 119 in the JAVA applet. In addition, the visual interface utilized by the user of monitor computer 118 would be downloaded as a web page to monitor computer 118 and operate under control of the browser. As different commands were indicated on the visual interface web page, the browser would respond by calling the appropriate JAVA code that was part of the JAVA applet.

One advantage of the "thin client" embodiments is that the user interface is nothing more than a web page design that is done at a high level. In addition, server 119 is a central place where necessary and desired changes in the JAVA code can be made without directly interacting with monitor computer 118 in order to pre-install software. In addition, the customization of the visual interface web page utilized by the user of a computer such as monitor computer 118 is greatly enhanced by the user being able to interact with server 119 via the browser of monitor computer 118. Not only are users used to utilizing browsers, but the development of the necessary program is made a great deal easier because of this type of interface. Also, if the owner of the systems illustrated in FIG. 1 or 2 wishes, they can easily place predefined user interfaces on server 119. In addition, it is easy to modify the language that will be used for the audio messages of the audio call status information with respect to country. A new language can be added simply by putting the necessary audio messages onto server 119 where the new audio messages can be selected by the users or by user profiles created by the owner of the system.

The previous embodiments described for FIG. 1 can be implemented on the system illustrated in FIG. 2.

In the previous sections, it was described how audio call status information could be provided to a user of an IP telephone set such as IP telephone sets 112-113. It is also highly desirable to provide audio call status information for the users of more conventional telephones such as telephone sets 107-108. These telephone sets may be analog, ISDN, or proprietary protocol type telephone sets.

To understand how audio call status information could be provided for a user (user 121) of telephone set 108, consider the following example. To set up the operations of providing the audio call status information, the user of telephone set 108 utilizes monitor computer 118 to establish a logical connection with the control computer 101 via WAN 111 and network trunk 106. In one embodiment, monitor computer 118 establishes this logical connection to computer 101 by opening a socket on computer 101 to a call status control routine. The user of monitor computer 118 then identifies telephone set 108 by telephone number and supplies an optional password to control computer 101. Control computer 101 is responsive to monitor computer 118 to transmit all control status information not only to telephone set 108 but also to monitor computer 118 via WAN 111. In addition, control computer 101 may optionally transmit to monitor computer 118 control information received from telephone set 108.

Monitor computer 118 is responsive to the call status information and control information received from computer 101 via WAN 111 to perform the previously described operations of providing audio call status information. In addition, monitor computer 118 may be programmed to indicate on its visual interface and audio interface the operations that the user is performing on telephone set 108.

The program utilized by monitor computer 118 to provide the audio call status information may be performed in either a thick client form or a thin client form. The thin client form has the advantage of being easier to modify by the owner of the system illustrated in FIG. 1 or the manufacturer as changes are made in the software being executed by control computer 101. In addition, the visual interface in the thin client implementation is a web page and can be more readily modified than the visual interface of the thick client implementation.

Figure 3:
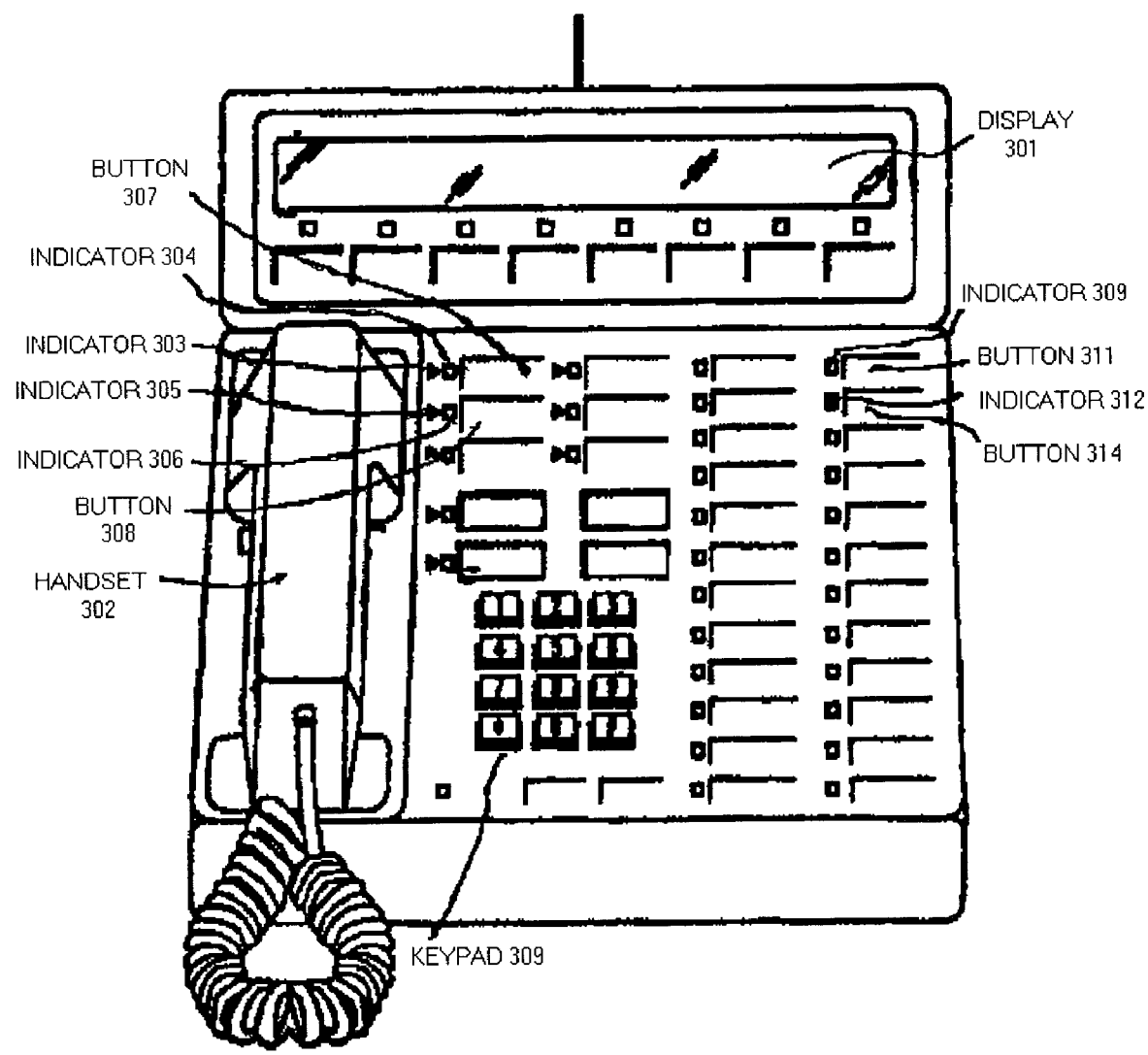
FIG. 3 illustrates, in pictorial form, an embodiment of an IP telephone set.

FIG. 3 illustrates an embodiment of IP telephone set 112. The user of IP telephone set 112 speaks and listens through handset 302. Although not illustrated in FIG. 3, IP telephone set 112 also has a speaker and microphone for conference calls. Display 301 is utilized to display the telephone number being dialed by keypad 309 during the placement of an outgoing call and displays the name and telephone number of the calling party for an incoming call. IP telephone set 112 has a number of telephone lines that could be selected with each line being denoted by a pair of indicators and a button. For example, indicators 303 and 304 and button 307 indicate line 1. Indicators 305 and 306 and button 308 indicate line 2. If the user is active on line 1, indicator 304 will be on as well as indicator 303. If the user has a caller on hold on line 2, indicator 305 will flash. The user of IP telephone set 112 selects line 1 by activating button 307. Similarly, the user activates line 2 by activating button 308.

Pairs of indicators and buttons, such as indicator 309 and button 311, may be used for activating a variety of operations. One is to automatically dial a party that had been preprogrammed by the user or to activate a feature such as using the conference facilities of IP telephone set 112. If button 311 is activated, indicator 309 will turn on. Indicator 312 and button 314 have similar functions. In general, there would be a number of such combinations of indicators and buttons as illustrated by 309, 311, 312, and 314. All button activation information is transmitted to control computer 101, and control computer 101 controls the state of the indicators.

Figure 4:
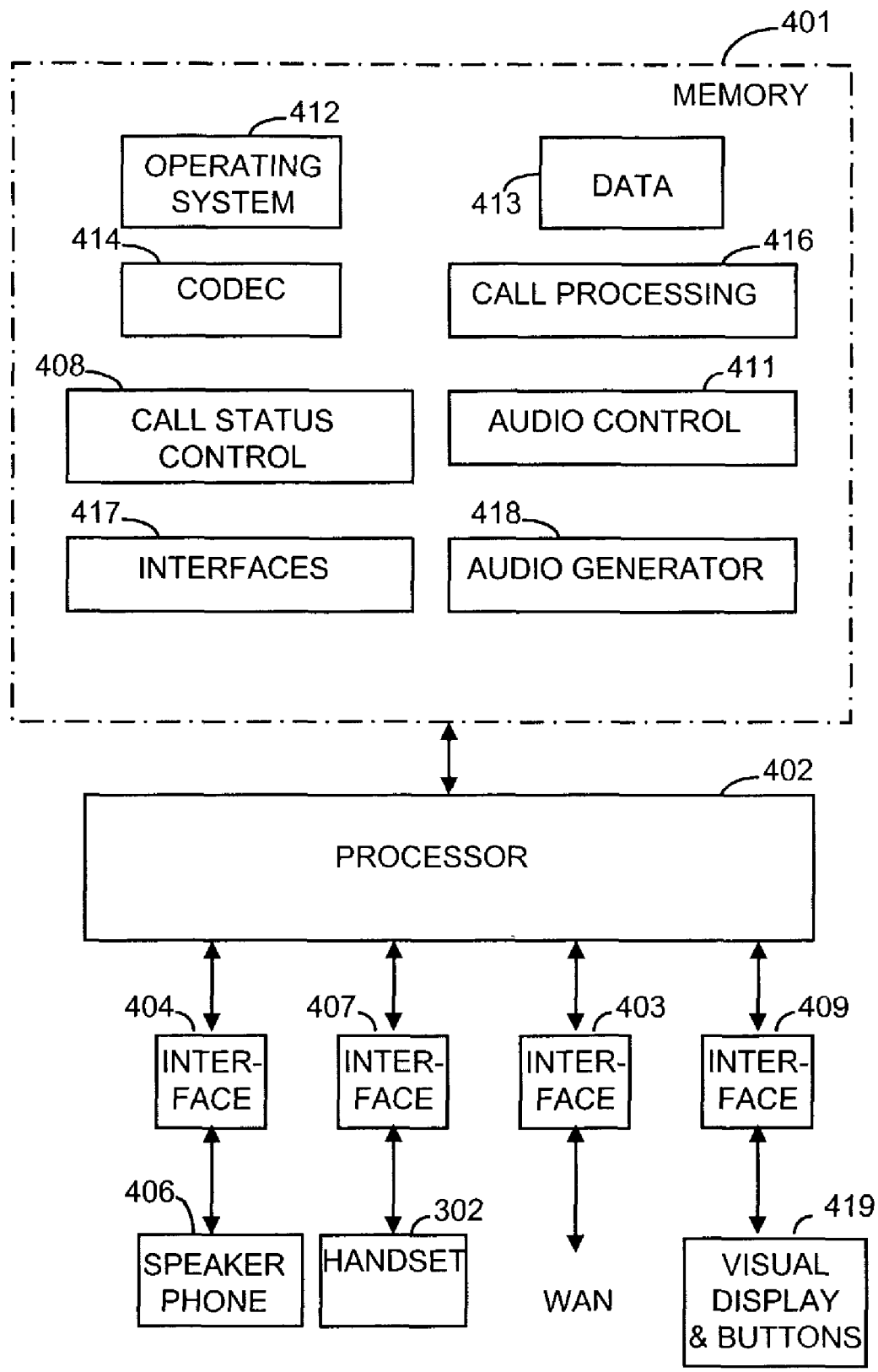
FIG. 4 illustrates, in block diagram form, an embodiment of an IP telephone set.

FIG. 4 illustrates, in block diagram form, one embodiment of IP telephone set 112. Processor 402 provides the overall control for the functions of IP telephone set 112 by executing programs and storing and retrieving data from memory 401. Processor 402 connects to WAN 111 or 204 via interface 403. Processor 402 interfaces to handset 302 via interface 407 and connects to visual display and buttons 419 via interface 409. Visual display and buttons 419 is all of the indicators, buttons keypad, and display illustrated in FIG. 3. Processor 402 performs the operations of IP telephone set 112 by executing the routines illustrated in memory 401.

Operating system 412 provides the overall control and the necessary protocol operations. Operating system routine 412 provides all control functions required to implement the TCP/IP protocol as is well known to those skilled in the art. Data is stored in data block 413. CODEC 414 encodes and decodes the audio information for communication with handset 302 or conference speaker and microphone 406 for communication with WAN 111 or 204. Overall control of the call processing is performed by the IP telephone set 112 under the control of call processing routine 416. The communication and control of the various interfaces illustrated in FIG. 4 is provided by interfaces routine 417. Audio generator routine 414 implements other software methods for reproducing sounds for utilization with the invention.

Call status control routine 408 terminates the socket that is established by monitor computer 118 to receive the call status information from IP telephone set 112 as described in the previous examples. Operating system 412 is responsive to messages from monitor computer 118 to establish the socket that allows monitor computer 118 to communicate with call status control routine 408. When monitor computer 118 opens a socket on IP telephone set 112, it uses the IP address of IP telephone set 112 to transmit a message to a TCP/IP port on IP telephone set 112 that is associated with call status control routine 408. Operating system 412 is response to this message to establish a socket for monitor computer 118 to receive call status information from IP telephone set 112. This socket interconnects monitor computer 118 and call status control routine 408. The operating system of the IP telephone set 112 then directs future messages for the port from monitor computer 118 to this socket from which the messages are transferred to call status control routine 408. Similarly, messages from call status control routine 408 to the socket are transmitted to monitor computer 118. Call status control routine 408 receives information from call processing routine 416 concerning control information received via WAN 111 to update indicators or display 301 of visual display and buttons 419. Similarly, call status control 408 receives actuation information for buttons or the keypad of block 419 from call processing routine 416. Call status control 418 transmits this call status information to monitor computer 118.

Audio control routine 411 terminates a second socket that was described as being set up by monitor computer 118, as described in the previous examples, to have IP telephone set 112 reproduce the audio call status information. When monitor computer 118 opens the second socket on IP telephone set 112, it uses the IP address of IP telephone set 112 to transmit a message to another TCP/IP port on IP telephone set 112 that is associated with audio control routine 411. Operating system 412 is response to this message to establish a socket for monitor computer 118 to receive call status information from IP telephone set 112. This other socket interconnects monitor computer 118 and audio control routine 411. The operating system of the IP telephone set 112 then directs future messages for the port from monitor computer 118 to this other socket from which the messages are transferred to audio control routine 411. Similarly, messages from audio control routine 411 to the other socket are transmitted to monitor computer 118. The speaker of unit 406 or the receiver of handset 302 can be utilized for this reproduction of the audio call status information. Audio control 411 can utilize CODEC routine 414 to reproduce this audio call status information or audio generator routine 418. The audio information is transferred via the appropriate handset to either the speaker or receiver.

Figure 5:
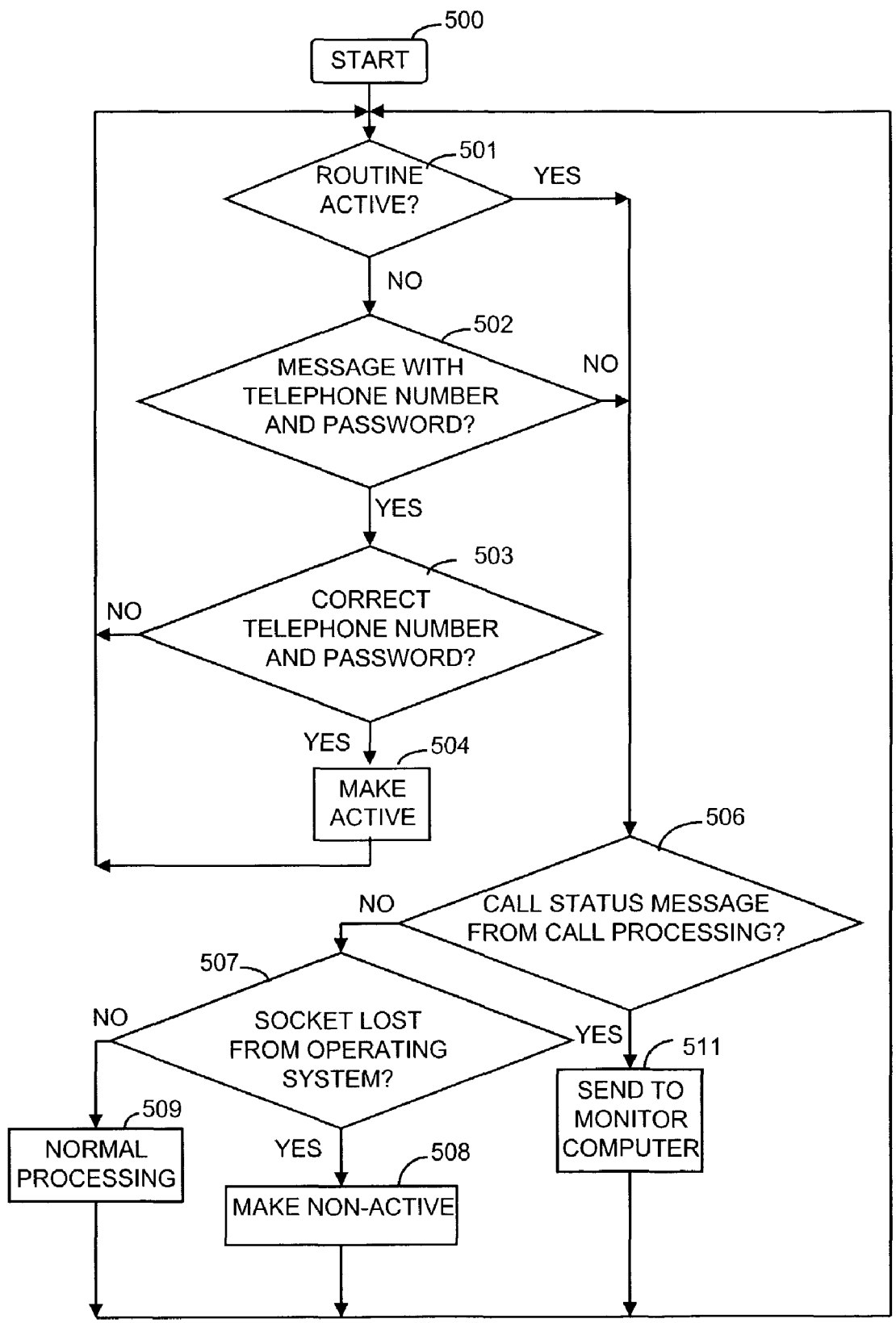
FIG. 5 illustrates, in flow chart form, operations performed by an embodiment of a call status control routine.

FIG. 5 illustrates, in flowchart form, operations performed by an embodiment of a call status control routine such as call status control routine 408 of FIG. 4. After being started in block 500, decision block 501 determines if the routine is active with respect to receiving call status information from an IP telephone set. Active in this case means that there is a socket set up to an IP telephone set by the operating system. If the answer is no, decision block 502 determines if there is a message containing a telephone number and password of an IP telephone set. This indicates that a monitor computer is attempting to establish communication with a call status control routine. If the answer is yes, decision block 503 determines if the telephone number and password for this particular IP telephone set has been received. If the answer is no, control is transferred back to decision block 501. If the answer is yes, block 504 makes the state active and sends a message to the operating system to establish the socket with the IP telephone set. Note, that one skilled in the art could readily envision that blocks 501-504 could be performed within the operating system or some other routine.

If the answer is yes in decision block 501 or no in decision block 502, control is transferred to decision block 506. Decision block 506 determines if there is a call status message from the call processing routine. If the answer is no, control is transferred to decision block 507 which determines if communication has been lost with the monitor computer. The operating system would normally detect this loss of communication and inform the call status control routine in a manner well known to those skilled in the art. If the answer is no in decision block 507, control is transferred to block 509 which performs normal processing before returning control back to decision block 501. If the answer in decision block 507 is yes, control is transferred to block 508 which sets the state to non-active before returning control back to decision block 501.

Returning to decision block 506. If a call status message has been received from the call processing routine, block 511 transmits this message to the monitor computer before transferring control back to decision block 501.

Figure 6:
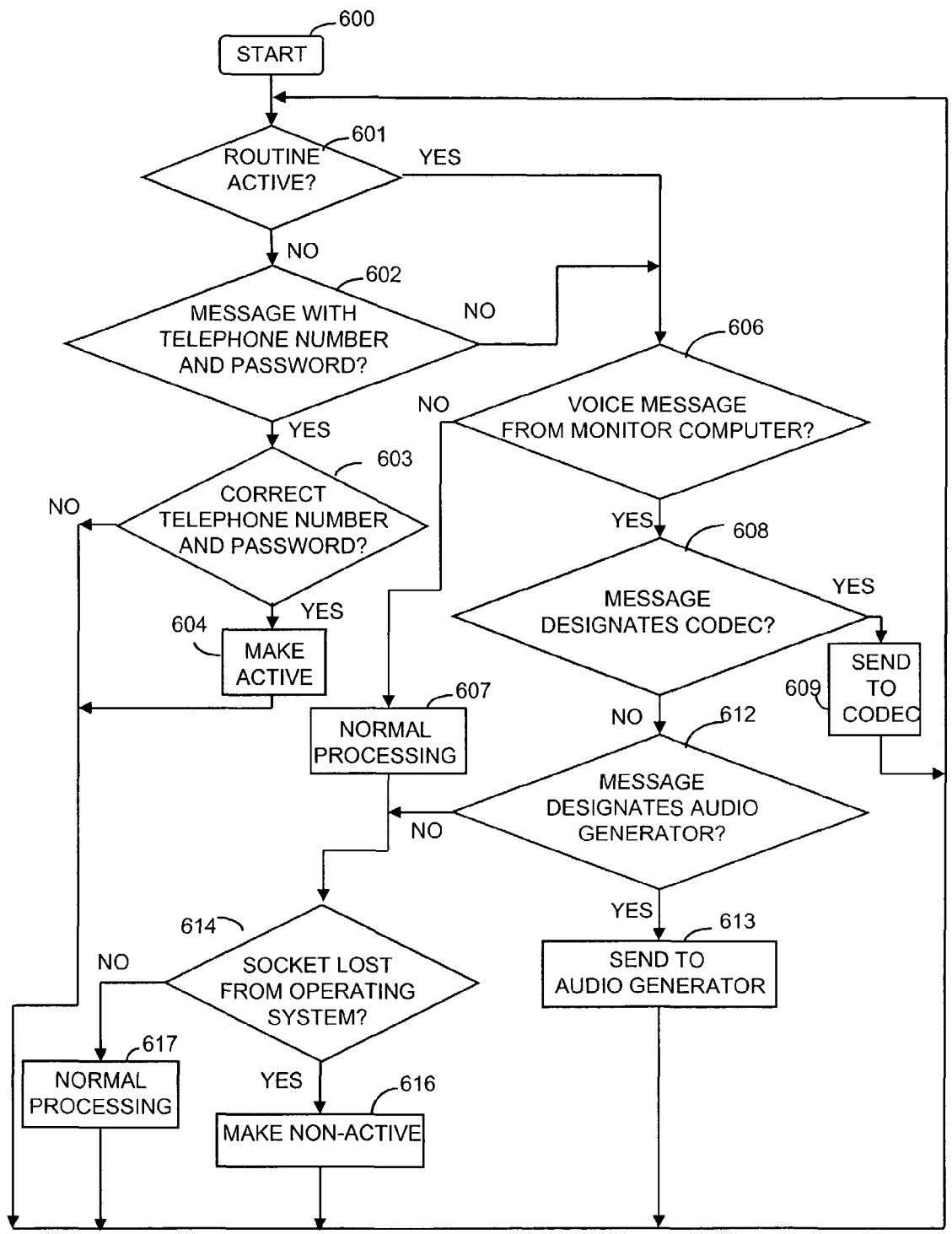
FIG. 6 illustrates, in flow chart form, operations performed by an embodiment of an audio control routine.

FIG. 6 illustrates, in flowchart form, operations performed by one embodiment of an audio control routine such as audio control routine 411 of FIG. 4. After being started in block 600, decision block 601 determines if the routine is active with respect to receiving call status information from an IP telephone set. Active in this case means that there is a socket set up to an IP telephone set by the operating system. If the answer is no, decision block 602 determines if there is a message containing a telephone number and password of an IP telephone set. This indicates that a monitor computer is attempting to establish communication with a call status control routine. If the answer is yes, decision block 603 determines if the telephone number and password for this particular IP telephone set has been received. If the answer is no, control is transferred back to decision block 601. If the answer is yes, block 604 makes the state active and sends a message to the operating system to establish the socket with the IP telephone set. Note, that one skilled in the art could readily envision that blocks 601-604 could be performed within the operating system or some other routine.

If the answer is yes in decision block 601 or no in decision block 602, control is transferred to decision block 606. The latter decision block determines if a voice message has been received from the monitor computer. If the answer is no, control is transferred to block 614 whose operations are described below. If the answer in decision block 606 is yes, decision block 608 determines if the voice message designates that the CODEC routine of the IP telephone should be utilized to present the message to the user. If the answer is yes in decision block 608, the message is sent to the CODEC routine by block 609. Note, if the message is sent to the CODEC then the message will be played in the receiver of the IP telephone set that is currently being utilized by the user.

Returning to decision block 608. If the answer is no, decision block 612 determines if the message designates that the audio generator routine is to be used to present the message to the user. If the answer is yes, block 613 transmits the voice message to the audio generator routine before transferring control back to decision block 601.

Returning to decision block 612, if the answer is no, control is transferred to decision block 614 which determines if communication has been lost with the monitor computer. The operating system would normally detect this loss of communication and inform the call status control routine in a manner well known to those skilled in the art. If the answer is no in decision block 614, control is transferred to block 617 which performs normal processing before returning control back to decision block 601. If the answer in decision block 614 is yes, control is transferred to block 616 which sets the state to non-active before returning control back to decision block 601.

Figure 7:
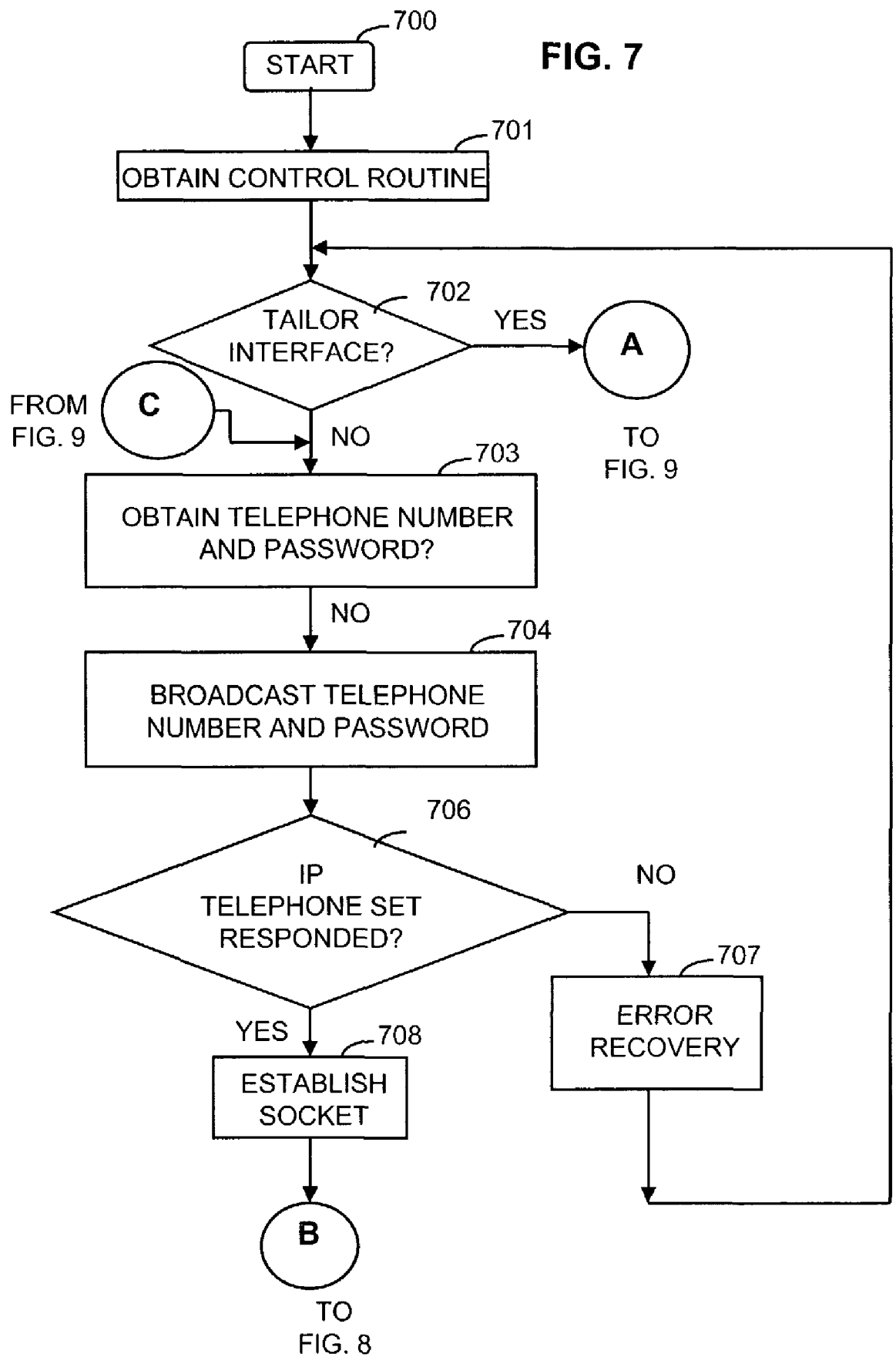
FIGS. 7-9 illustrate, in flow chart form, operations performed by an embodiment of a monitor computer.
Figure 8:
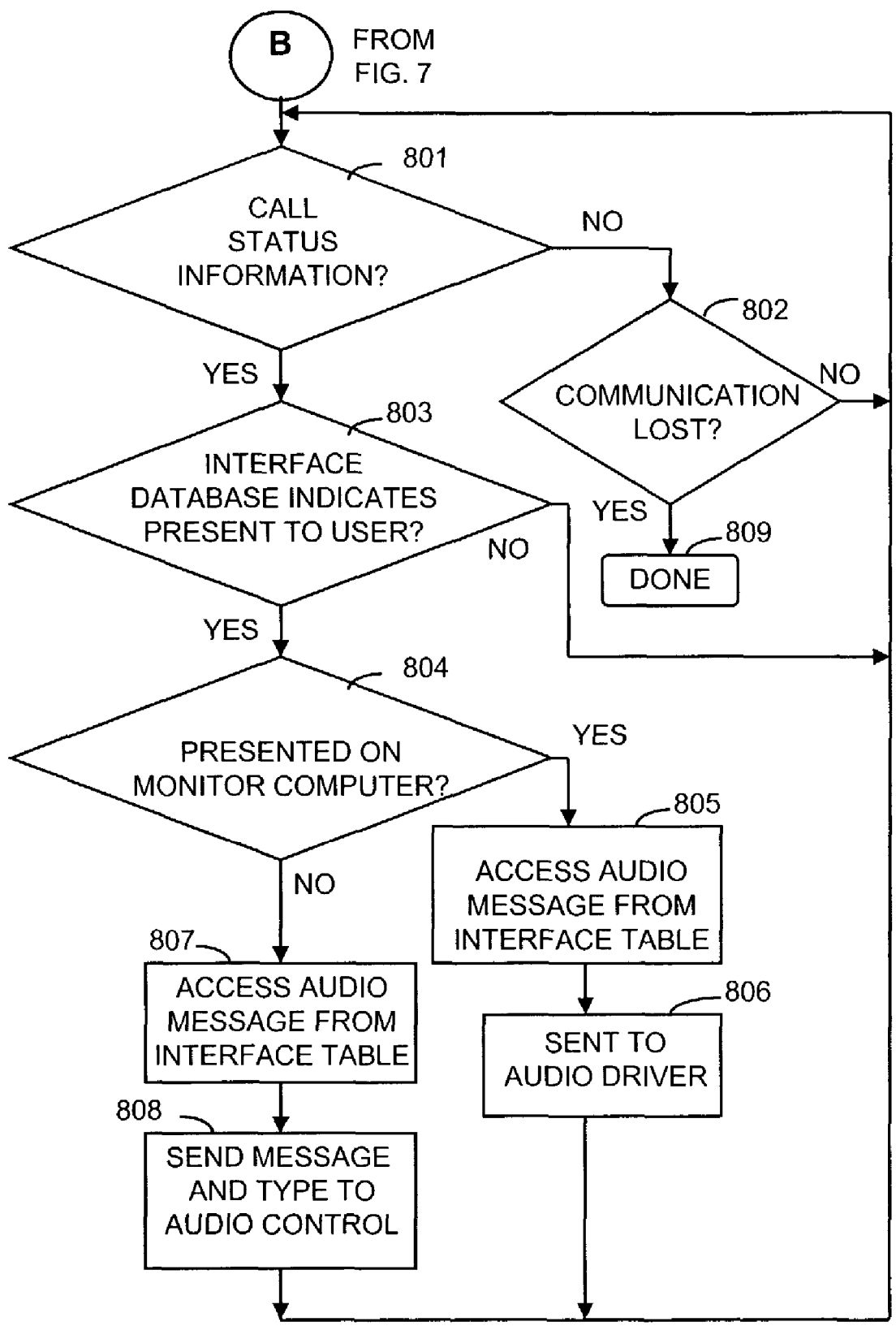
Figure 9:
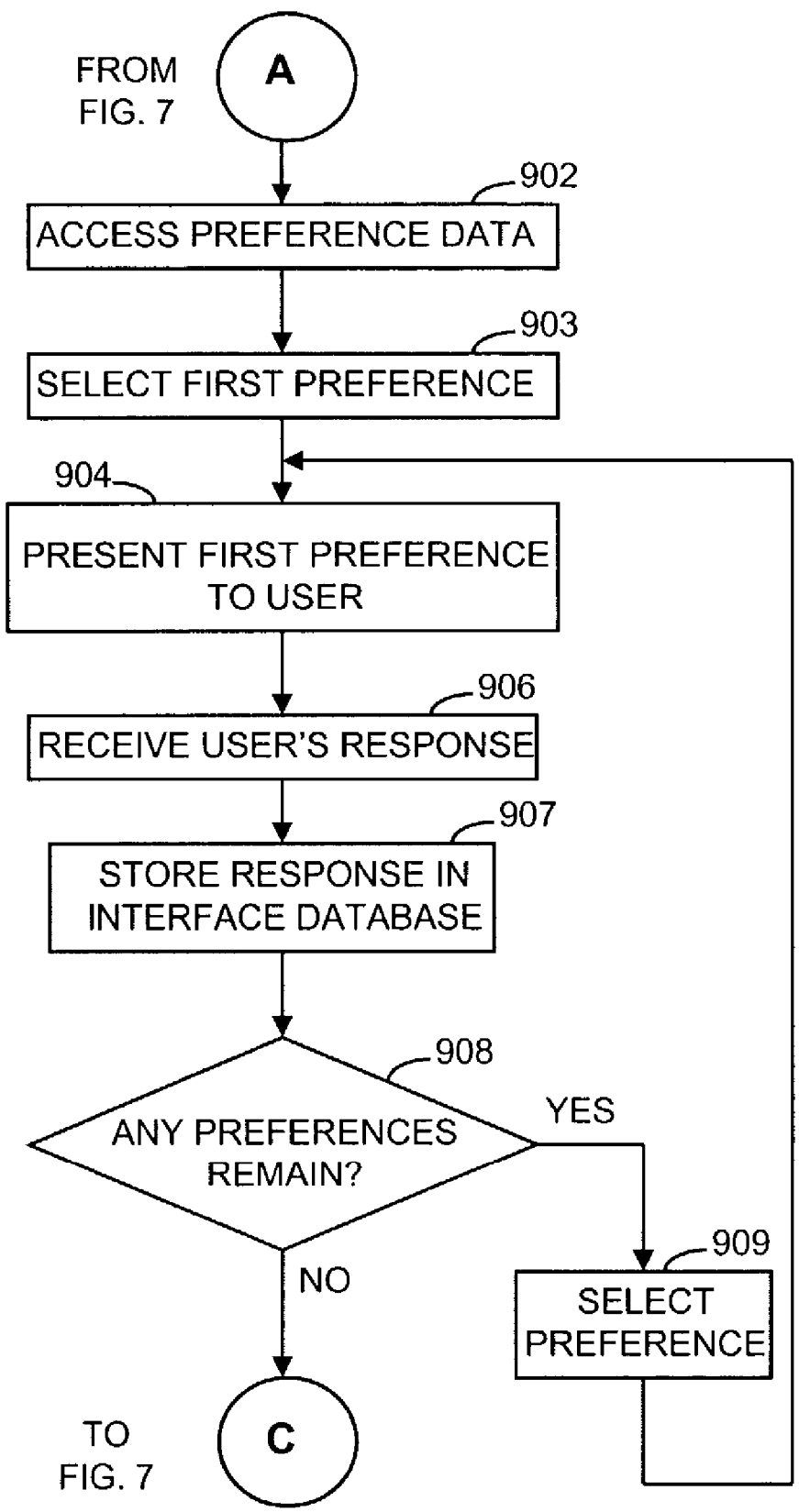

FIGS. 7-9 illustrate, in flowchart form, operations performed by one embodiment of a monitor computer such as monitor computer 118 of FIG. 1 where the monitor computer is receiving the call status information from an IP telephone set. After being started, in block 700, block 701 obtains the control routine whose operations are illustrated in FIGS. 7-9. The control routine will be obtained from internal memory if the embodiment is implementing a thick client implementation; and the control routine will be obtained from a server, such as server 119, if the embodiment is implementing a thin client implementation. After the control routine is obtained and executed, decision block 702 determines if it is necessary to tailor the user interface or the user. This decision is based on whether the system allows such tailoring and whether it is necessary. It may be that the interface has already been tailored for the user, and this information is stored in an interface database. If the answer in decision block 702 is yes, control is transferred to block 902 of FIG. 9. If the answer in decision block 702 is no, block 703 obtains the telephone number and password for the IP telephone set that is to be monitored. Block 703 may perform this operation by obtaining it from a server such as server 119. In addition, the user may know the telephone number and the password and enter it manually. After execution of block 703, block 704 broadcasts the telephone number and password to all of the IP telephone sets.

After execution of block 704, control is transferred to decision block 706 which determines if an IP telephone set responded to the broadcasting of the telephone number and the password. One skilled in the art would readily realize that the telephone number and password could be encrypted so that it was not possible for a computer to fraudulently gain access to the control status information of an IP telephone set. If the answer in decision block 706 is no, control is transferred to block 707 which performs error recovery before transferring control back to block 703. If the answer is decision block 706 is yes, block 708 establishes a socket with the operating system of the IP telephone set that responded. The socket establishes communication to the call status control routine of that IP telephone set before transferring control to decision block 801 of FIG. 8.

Decision block 801 determines if call status information has been received as a message from the IP telephone set. If the answer is no, decision block 802 determines if communication has been lost between the monitor computer and the IP telephone set. If the answer is yes, operations are terminated in block 809. In addition to transferring control to block 809 upon communication being terminated between the monitored computer and the IP telephone set, decision block 802 also is responsive to user input to terminate operations. If the answer is no in decision block 802, control is transferred back to decision block 801.

Returning to decision block 801, if the answer is yes, control is transferred to block 803 which accesses the interface database to determine if the particular call status information should be presented to the user. As is discussed with respect to FIG. 9, the user or system administrator has the capability of determining which call status information will be presented to the user as well as how often a particular type of call status information must occur before an instance of the call status information is presented to the user. If the answer is no in decision block 803, control is transferred back to decision block 801. If the answer is yes in decision block 803, control is transferred to decision block 804 which determines from the interface database if the call status information is to be presented by the monitor computer or transmitted to the IP telephone set for presentation to the user. If the answer in decision block 804 is that the monitor computer should present the information, block 805 accesses the encoded audio message from the interface database along with the audio driver type that is to be utilized, and block 806 transmits the call status information to the audio driver of the monitor computer for playout. If the decision in decision block 804 is that the call status information is to be presented in audio form to the user on the IP telephone set, block 807 accesses the encoded audio message from the interface database along with the audio driver type that is to be utilized on the IP telephone set. Block 808 then sends a message that contains the encoded audio message and the audio driver type to the audio control routine of the IP telephone set before transferring control back to decision block 801.

Returning to FIG. 7, if the answer in decision block 702 is yes that the user interface must be tailored, control is transferred to block 902 of FIG. 9. FIG. 9 illustrates the operations performed by an embodiment in gathering the options of a user wants visual information communicated to them with audio messages. The audio messages can be voice messages or other audio sounds. For example, if the user is talking on one call but has a second call on hold, the user may choose to have the fact that the second call is on hold presented to them as an audio tone or as a voice message. In addition, the user can specify their preference for how often they should receive an audio message with respect to the call on hold. The preference data comprises the various visual messages that can be transmitted to the users IP telephone set and the options that the user has to tailor the resulting audio messages. The interface may be tailored to each individual user or a system administrator may establish one standard interface. In one embodiment, if the system administrator is determining the interface, then, the preference information and accompanying options would be presented in a visual table or other means well known to those skilled in the art. If the information is presented to each user, then in one embodiment the preference information with options is presented as a voice message and the user would select options by responding with voice responses. The voice responses would be interpreted using well known voice-to-text software routines. After receiving control from decision block 702, block 902 access the preference data for a particular IP telephone set, and block 903 selects the first preference as the selected preference to be presented to the user by block 904. Block 906 receives the user's response and converts this response to text and verifies that it is a correct response. Block 907 then stores the received response in the interface database. Decision block 908 determines if there are any preferences that remain to have options selected. If the answer is yes, control is transferred to block 909. Block 909 selects the next preference from the preference data and transfers control back to block 904. If the answer in decision block 908 is no, control is transferred back to block 703 of FIG. 7.

Figure 10:
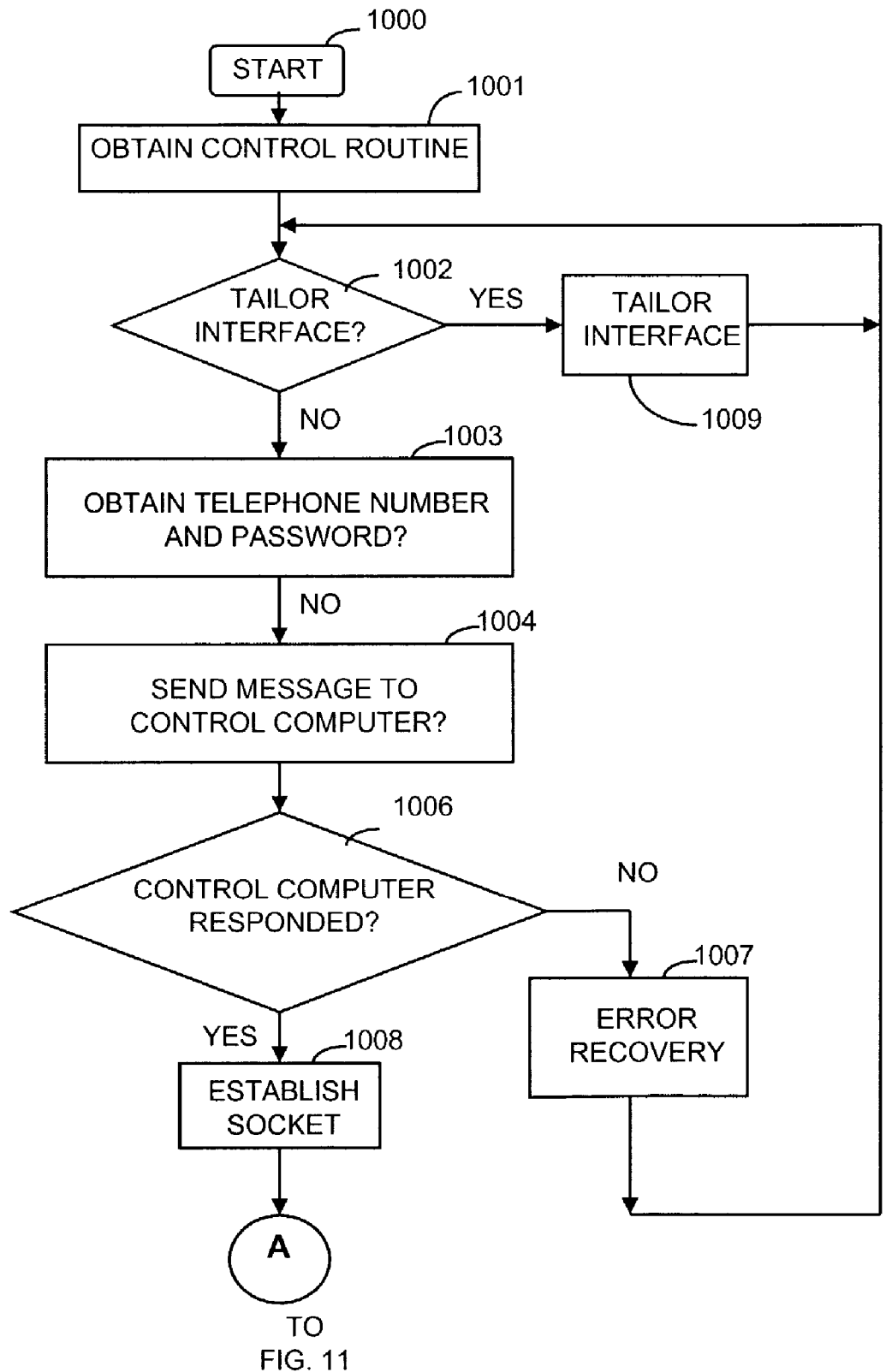
FIGS. 10 and 11 illustrate, in flow chart form, operations performed by another embodiment of a monitor computer.
Figure 11:
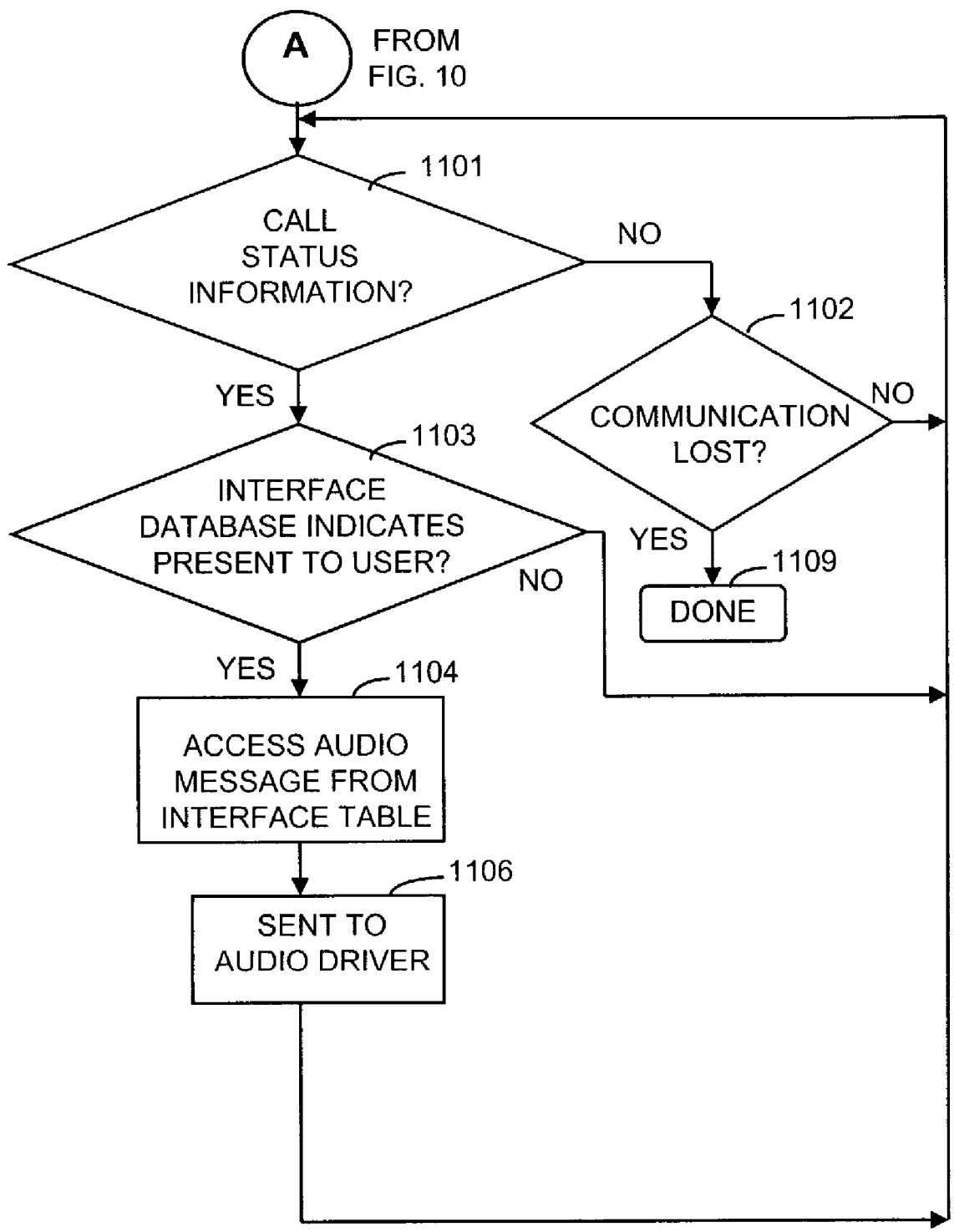

FIGS. 10-11 illustrate, in flowchart form, operations performed by one embodiment of a monitor computer such as monitor computer 118 of FIG. 1 where the monitor computer is receiving the call status information from a control computer that is controlling a switching system, such as telecommunication switching system 100. After being started, in block 1000, block 1001 obtains the control routine whose operations are illustrated in FIGS. 10-11. The control routine will be obtained from internal memory if the embodiment is implementing a thick client implementation; and the control routine will be obtained from a server, such as server 119 if the embodiment is implementing a thin client implementation. After the control routine is obtained and executed, decision block 1002 determines if it is necessary to tailor the user interface or the user. This decision is based on whether the system allows such tailoring and whether it is necessary. It may be that the interface has already been tailored for the user, and this information is stored in an interface database. If the answer in decision block 1002 is yes, control is transferred to block 1009 that performs operations similar to those illustrated in FIG. 9. If the answer in decision block 1002 is no, block 1003 obtains the telephone number and password for the IP telephone set that is to be monitored. Block 1003 may perform this operation by obtaining it from a server such as server 119. In addition, the user may know the telephone number and the password and enter it manually. After execution of block 1003, block 1004 broadcasts the telephone number and password to all of the IP telephone sets.

After execution of block 1004, control is transferred to decision block 1006 which determines if an IP telephone set responded to the broadcasting of the telephone number and the password. One skilled in the art would readily realize that the telephone number and password could be encrypted so that it was not possible for a computer to fraudulently gain access to the control status information of an IP telephone set. If the answer in decision block 1006 is no, control is transferred to block 1007 which performs error recovery before transferring control back to block 1003. If the answer is decision block 1006 is yes, block 1008 establishes a socket with the operating system of the IP telephone set that responded. The socket establishes communication to the call status control routine of that IP telephone set before transferring control to decision block 1101 of FIG. 11.

Decision block 1101 determines if call status information has been received as a message from the IP telephone set. If the answer is no, decision block 1102 determines if communication has been lost between the monitor computer and the IP telephone set. If the answer is yes, operations are terminated in block 1109. In addition to transferring control to block 1109 upon communication being terminated between the monitored computer and the IP telephone set, decision block 1102 also is responsive to user input to terminate operations. If the answer is no in decision block 1102, control is transferred back to decision block 1101.

Returning to decision block 1101, if the answer is yes, control is transferred to block 1103 which accesses the interface database to determine if the particular call status information should be presented to the user. As is discussed with respect to FIG. 9, the user or system administrator has the capability of determining which call status information will be presented to the user as well as how often a particular type of call status information must occur before an instance of the call status information is presented to the user. If the answer is no in decision block 1103, control is transferred back to decision block 1101. If the answer is yes in decision block 1103, control is transferred to block 1104. Block 1104 accesses the encoded audio message from the interface database along with the audio driver type that is to be utilized, and block 1106 transmits the call status information to the audio driver of the monitor computer for playout before transferring control back to decision block 1101.

Figure 12:
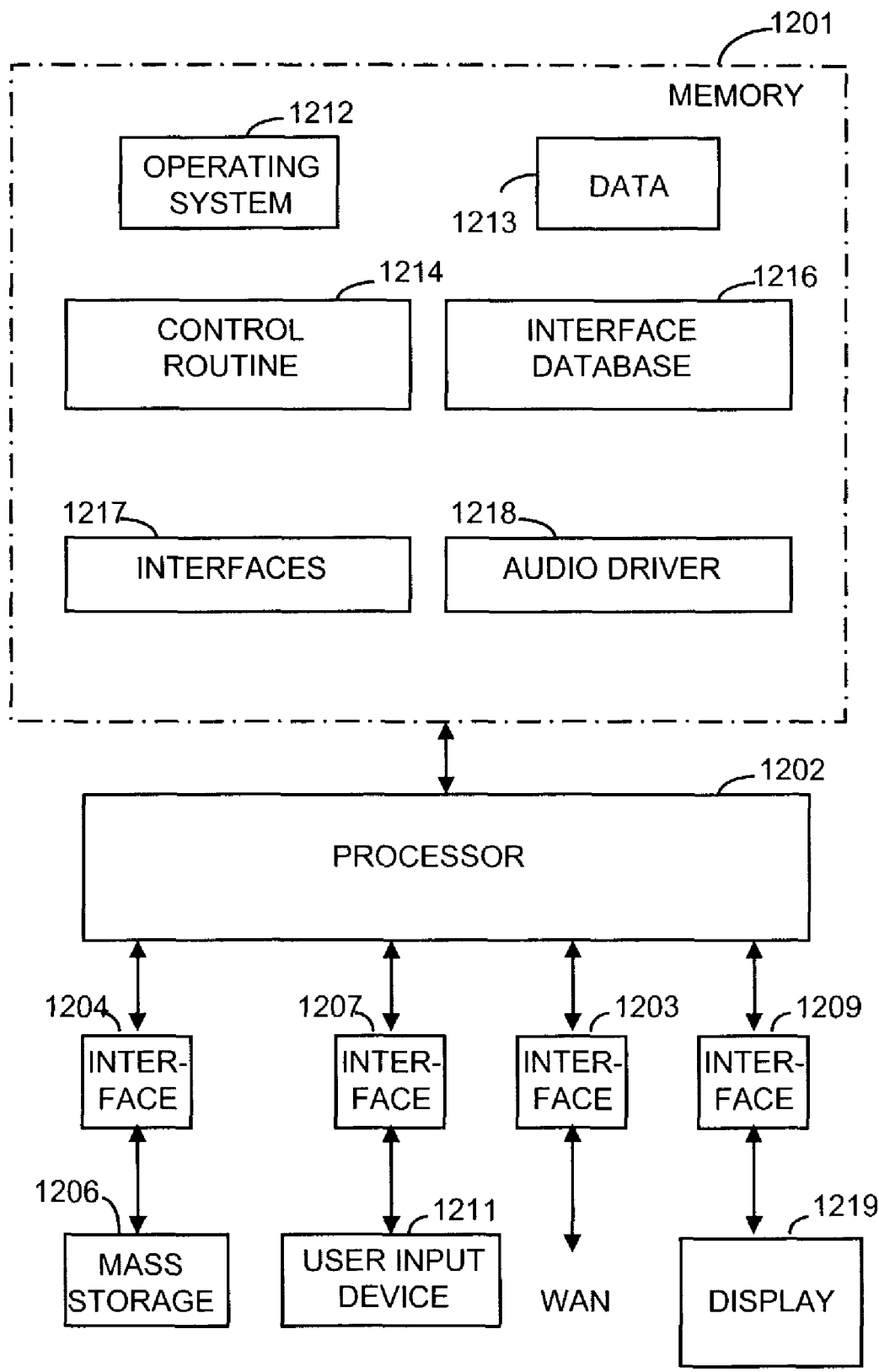
FIG. 12 illustrates, in block diagram form, an embodiment of a monitor computer.

FIG. 12 illustrates, in block diagram form, one embodiment of a monitor computer. Processor 1202 provides the overall control for the functions of a monitor computer by executing programs and storing and retrieving data from memory 1201. Processor 1202 connects to WAN 111 or 204 via interface 1203. Processor 1202 interfaces to user input device 1211 via interface 1207 and connects to display 1219 via interface 1209. Processor 1202 performs the operations of a monitor computer by executing the routines illustrated in memory 1201.

Operating system 1212 provides the overall control and the necessary protocol operations. Operating system routine 1212 provides all control functions required to implement the TCP/IP protocol as is well known to those skilled in the art. Data is stored in data block 1213. Interface database 1216 stores preferences and options that define the user interface. Overall control is performed by control routine 1216. The communication and control of the various interfaces illustrated in FIG. 12 is provided by interfaces routine 1217. Audio driver 1218 controls the reproduction of sounds.

When the operations of an IP telephone set or monitor computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The IP telephone set or monitor computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store-the program for use by or in connection with the instruction execution system, apparatus, or device. For example, the computer-readable medium can be, but is not limited to, an electronic, magnetic, optical, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where IP telephone set or monitor computer is implemented in hardware, IP telephone set or monitor computer can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for providing visual call status information as audio information, comprising the steps of:
   establishing by a monitor computer a first network connection via a network between the monitor computer and a telephone set;
   receiving by the telephone set visual call status information via a second network connection via the network from an endpoint device wherein the second network connection via the network is between the endpoint device and the second telephone set;
   transmitting by the telephone set the visual call status information to the monitor computer via the first network connection;
   converting by the monitor computer the visual call status information from; and
   presenting by the monitor computer the audio call status information to a user of the telephone set.

2. The method of claim 1 wherein the step of presenting comprises the step of producing the audio call status information on the telephone set.

3. The method of claim 2 wherein the step of presenting further comprises the step of transmitting by the monitor computer the audio call status information from the monitor computer to the telephone set.

4. The method of claim 3 wherein the step of transmitting the audio call status information comprises the step of establishing, by the monitor computer, a third network connection via the network between the telephone set and the monitor computer.

5. The method of claim 4 wherein the network supports a protocol that allows for establishment of sockets and the step of establishing the third network connection comprises the step of setting up, by the monitor computer, a socket on the telephone set which will allow the third network connection to be established.

6. The method of claim 2 wherein the audio call status information is produced by a CODEC used for telecommunication voice information of telecommunication calls.

7. The method of claim 2 wherein the audio call status information is produced by an audio generator other than a CODEC used for telecommunication voice information of telecommunication calls.

8. The method of claim 1 wherein the endpoint device is a telecommunication switching system.

9. The method of claim 1 wherein the endpoint device is another telephone set.

10. The method of claim 1 wherein the step of presenting comprises the step of producing the audio call status information on the monitor computer.

11. The method of claim 1 wherein the step of establishing comprises the step of obtaining the network address of the telephone set from the telephone set.

12. The method of claim 11 wherein the step of obtaining comprises the steps of broadcasting a telecommunication identification number of the telephone set on the network by the monitor computer; and transmitting by the telephone set the network address of the telephone set from the telephone set to the monitor computer in response to receipt of the broadcast telecommunication identification number.

13. The method of claim 1 wherein the step of converting comprises the step of determining if the visual call status information should be presented as the audio call status information prior to conversion.

14. The method of claim 13 wherein the step of determining comprises the step of accessing a database which contains information defining which of the visual call status information is to be presented as the audio call status information.

15. The method of claim 1 wherein the network supports a protocol that allows for establishment of sockets and the step of establishing the first network connection comprises the step of setting up, by the monitor computer, a socket on the telephone set which will allow the first network connection to be established.

16. A method for providing visual call status information as audio call status information by a telephone set, comprising the steps of:

establishing by the telephone set a first network connection via a network with a monitor computer in response to a first message from a monitor computer; and transmitting by the telephone set visual call status information and, received from an endpoint device via a second network connection via the network to the monitor computer via the first network connection for conversion and presentation, by the monitor computer, as audio call status information to a user of the telephone set.

17. The method of claim 16 further comprises the steps of receiving by the telephone set the audio call status information from the monitor computer; and producing by the telephone set the audio call status information to the user of the telephone set.

18. The method of claim 17 wherein the step of receiving comprises the steps of establishing a third network connection via the network between the monitor computer and the telephone set in response to a second message from the monitor computer; and receiving the audio call status information from the monitor computer via the third network connection.

19. The method of claim 18 wherein the audio call status information is produced by a CODEC used for telecommunication voice information of telecommunication calls.

20. The method of claim 18 wherein the audio call status information is produced by an audio generator other than a CODEC used for telecommunication voice information of telecommunication calls.

21. The method of claim 18 wherein the network supports a protocol that allows for establishment of sockets and the step of establishing the third network connection comprises the step of setting up a socket with the monitor computer which will allow the third network connection to be established.

22. The method of claim 16 wherein the network supports a protocol that allows for establishment of sockets and the step of establishing the first network connection comprises the step of setting up a socket with the monitor computer which will allow the first network connection to be established.

23. The method of claim 16 wherein the endpoint device is a switching system and the method further comprises the step of receiving the visual call status information from the switching system via the second network connection via the network.

24. The method of claim 16 further comprises transmitting the network address of the telephone set to the monitor computer by the telephone set in response to a telecommunication identification number of the telephone set being received on the network from the monitor computer.

25. A method for providing by a monitor computer visual call status information as audio information, comprising the steps of:

establishing by the monitor computer a first network connection via a network between the monitor computer and a telephone set;

receiving, by the monitor computer, visual call status information via the first network connection from the telephone set;

converting by the monitor computer the visual call status information to audio call status information; and presenting by the monitor computer the audio call status information to a user of the telephone set.

26. The method of claim 25 wherein the step of presenting comprises the steps of establishing a second network connection via the network between the monitor computer and the telephone set; and transmitting the audio call status information via the second network connection to the telephone set.

27. The method of claim 26 wherein the network supports a protocol that allows for establishment of sockets and the step of establishing the second network connection comprises the step of setting up a socket on the telephone set which will allow the second network connection to be established.

28. The method of claim 25 wherein the step of presenting comprises the step of producing the audio call status information on the monitor computer.

29. The method of claim 25 wherein the step of establishing comprises the step of obtaining by the monitor computer the network address of the telephone set from the telephone set.

30. The method of claim 29 wherein the step of obtaining comprises the steps of broadcasting by the monitor computer a telecommunication identification number of the telephone set on the network; and receiving by the monitor computer the network address of the telephone set from the telephone set wherein the telephone set responds to receipt of the broadcast telecommunication identification number.

31. The method of claim 25 wherein the step of converting comprises determining if the visual call status information should be presented as the audio status information prior to conversion.

32. The method of claim 31 wherein the step of determining comprises the step of accessing a database which contains information defining which of the visual call status information is to presented as the audio call status information.

33. The method of claim 25 wherein the network supports a protocol that allows for establishment of sockets and the step of establishing the first network connection comprises the step of setting up a socket on the telephone set which will allow the first network connection to be established.

34. A non-transitory computer-readable medium storing computer-executable instructions for:
  establishing by a monitor computer a first network connection via a network between the monitor computer and a telephone set;
  receiving by the telephone computer visual call status information via a second network connection via the network from an endpoint device wherein the second network connection via the network is between the endpoint device and the telephone set;
  transmitting by the telephone set the visual call status information to the monitor computer via the first network connection;
  converting by the monitor computer the visual call status information to audio call status information; and
  presenting by the monitor computer the audio call status information to a user of the telephone set.

35. The non-transitory computer-readable medium of claim 34 further comprises browser computer-executable instructions for retrieving the computer-executable instructions for establishing, converting and presenting from a server and storing the retrieved computer-executable instructions on the monitor computer.

36. The non-transitory computer-readable medium of claim 34 wherein the computer-executable instructions for presenting comprise computer-executable instructions for producing the audio call status information on the telephone set.

37. The non-transitory computer-readable medium of claim 36 wherein the computer-executable instructions for presenting further comprise computer-executable instructions for transmitting the audio call status information from the monitor computer to the telephone set.

38. The non-transitory computer-readable medium of claim 37 further comprises browser computer-executable instructions for retrieving the computer-executable instructions for establishing, converting and presenting from a server and storing the retrieved computer-executable instructions on the monitor computer.

39. The non-transitory computer-readable medium of claim 37 wherein computer-executable instructions for transmitting the audio call status information comprise computer-executable instructions for establishing, by the monitor computer, a third network connection via the network between the telephone set and the monitor computer.

40. The non-transitory computer-readable medium of claim 39 wherein the network supports a protocol that allows for establishment of sockets and computer-executable instructions for establishing the third network connection comprise computer-executable instructions for setting up, by the monitor computer, a socket on the telephone set.

41. The non-transitory computer-readable medium of claim 36 wherein the audio call status information is produced by a CODEC used for telecommunication voice information of telecommunication calls.

42. The non-transitory computer-readable medium of claim 36 wherein the audio call status information is produced by an audio generator other than a CODEC used for telecommunication voice information of telecommunication calls.

43. The non-transitory computer-readable medium of claim 34 wherein the endpoint device is a telecommunication switching system.

44. The non-transitory computer-readable medium of claim 35 wherein the endpoint device is another telephone set.

45. The non-transitory computer-readable medium of claim 34 wherein the computer-executable instructions for presenting comprise computer-executable instructions for producing the audio call status information on the monitor computer.

46. The non-transitory computer-readable medium of claim 34 wherein computer-executable instructions for establishing comprise computer-executable instructions for obtaining the network address of the telephone set from the telephone set.

47. The non-transitory computer-readable medium of claim 46 wherein the computer-executable instructions for obtaining comprise computer-executable instructions for broadcasting by the monitor computer a telecommunication identification number of the telephone set on the network; and
  transmitting by the telephone set the network address of the telephone set from the telephone set to the monitor computer in response to receipt of the broadcast telecommunication identification number from the monitor computer.

48. The non-transitory computer-readable medium of claim 47 further comprises browser computer-executable instructions for retrieving the computer-executable instructions for establishing, converting and presenting from a server and storing on the monitor computer.

49. The non-transitory computer-readable medium of claim 34 wherein the computer-executable instructions for converting comprise computer-executable instructions for determining if the visual call status information should be presented as the audio call status information prior to conversion.

50. The non-transitory computer-readable medium of claim 49 wherein the computer-executable instructions for determining comprise computer-executable instructions for accessing a database which contains information defining which of the visual call status information is to be presented as the audio call status information.

51. The non-transitory computer-readable medium of claim 34 wherein the network supports a protocol that allows for establishment of sockets and computer-executable instructions for establishing the first network connection comprise computer-executable instructions for setting up, by the monitor computer, a socket on the telephone set.

52. A non-transitory computer-readable medium storing computer-executable instructions and stored in a telephone set for:
  establishing by the telephone set a first network connection via a network with a monitor computer in response to a first message from a monitor computer; and
  transmitting by the telephone set visual call status information and received from an endpoint device via a second network connection via the network from the telephone set to the monitor computer via the first network connection for conversion and presentation, by the monitor computer, as audio call status information to a user of the telephone set.

53. The non-transitory computer-readable medium of claim 52 further store computer-executable instructions for receiving the audio call status information from the monitor computer; and producing the audio call status information to the user of the telephone set.

54. The non-transitory computer-readable medium of claim 53 wherein the computer-executable instructions for receiving comprise computer-executable instructions for establishing a third network connection between the monitor computer and the telephone set in response to a second message from the monitor computer; and receiving the audio call status information from the monitor computer via the third network connection.

55. The non-transitory computer-readable medium of claim 54 wherein the audio call status information is produced by a CODEC used for telecommunication voice information of telecommunication calls.

56. The non-transitory computer-readable medium of claim 54 wherein the audio call status information is produced by an audio generator other than a CODEC used for telecommunication voice information of telecommunication calls.

57. The non-transitory computer-readable medium of claim 54 wherein the network supports a protocol that allows for establishment of sockets and computer-executable instructions for establishing the third network connection comprise computer-executable instructions for setting up a socket with the monitor computer.

58. The non-transitory computer-readable medium of claim 52 wherein the network supports a protocol that allows for establishment of sockets and computer-executable instructions for establishing the first network connection comprise computer-executable instructions for setting up a socket with the monitor computer.

59. The non-transitory computer-readable medium of claim 52 wherein the endpoint device is a switching system and the computer-readable medium further stores computer-executable instructions for receiving the visual call status information from the switching system via the second network connection via the network.

60. The non-transitory computer-readable medium of claim 52 further stores computer-executable instructions for transmitting by the telephone set the network address of the telephone set to the monitor computer in response to a telecommunication identification number of the telephone set being received on the network from the monitor computer.

61. A non-transitory computer-readable medium storing computer-executable instructions and stored in a monitor computer for:

establishing by the monitor computer a first network connection via a network between the monitor computer and a telephone set;

receiving from the telephone set by the monitor computer visual call status information via the first network from the telephone set;

converting by the monitor computer the visual call status information to audio call status information; and presenting by the monitor computer the audio call status information to a user of the telephone set.

62. The non-transitory computer-readable medium of claim 61 wherein the computer-executable instructions for presenting comprise computer-executable instructions for establishing a second network connection via the network between the monitor computer and the telephone set; and transmitting the audio call status information via the second network connection to the telephone set.

63. The non-transitory computer-readable medium of claim 62 further store browser computer-executable instructions for obtaining the computer-executable instructions for establishing, converting, accessing and presenting from a server and storing on the monitor computer.

64. The non-transitory computer-readable medium of claim 62 wherein the network supports a protocol that allows for establishment of sockets and computer-executable instructions for establishing the second network connection comprise computer-executable instructions for setting up a socket on the telephone set which will allow the second network connection to be established.

65. The non-transitory computer-readable medium of claim 61 wherein the computer-executable instructions for presenting comprise computer executable instructions for producing the audio call status information on the monitor computer.

66. The non-transitory computer-readable medium of claim 61 wherein computer executable instructions for establishing comprise computer executable instructions for obtaining the network address of the telephone set from the telephone set.

67. The non-transitory computer-readable medium of claim 66 wherein the computer executable instructions for obtaining comprise computer executable instructions for broadcasting a telecommunication identification number of the telephone set on the network; and receiving the network address of the telephone set from the telephone set wherein the telephone set responds to receipt of the broadcast telecommunication identification number.

68. The non-transitory computer-readable medium of claim 67 further stores browser computer-executable instructions for obtaining the computer-executable instructions for establishing, converting, accessing and presenting from a server and storing on the monitor computer.

69. The non-transitory computer-readable medium of claim 61 wherein the computer-executable instructions for converting comprise computer-executable instructions for determining if the visual call status information should be presented as the audio call status information prior to conversion.

70. The non-transitory computer-readable medium of claim 69 wherein the computer-executable instructions for determining comprise computer-executable instructions for accessing a database which contains information defining which of the visual call status information is to be presented as audio call status information.

71. The non-transitory computer-readable medium of claim 61 wherein the network supports a protocol that allows for establishment of sockets and computer-executable instructions for establishing the first network connection comprise computer-executable instructions for setting up a socket on the telephone set which will allow the first network connection to be established.

72. A method for providing visual call status information as audio information, comprising the steps of:

establishing by a telephone set a network connection via a first network to a control computer of a telecommunication switching system;

transmitting by the control computer visual call status information to the telephone set via the network connection of the first network;

establishing by the monitor computer another network connection via a second network between the control computer and the control computer;

accessing by the monitor computer the visual call status information from the control computer via the another network connection of the second network wherein the accessed visual call status information has also been transmitted by the control computer to the telephone set via the network connection of the first network;

converting by a monitor computer the visual call status information to audio call status information; and presenting by a monitor computer the audio call status information to a user of the telephone set.

73. The method of claim 72 further comprises the step of communicating voice information by the telephone set to another telephone set via the first network.

74. The method of claim 72 further comprises the step of communicating voice information by the telephone set to another telephone set via the first and second networks wherein the another telephone set communicates both voice information and visual call status information with the telecommunication switching system via the second network.

75. The method of claim 72 wherein the step of accessing via the another network connection of the second network comprises the steps of obtaining a password for the telephone set; and transmitting by the monitor computer the password and a telecommunication identified number for the telephone set to the control computer via the another network connection of the second network.

76. The method of claim 75 wherein the second network supports a protocol that allows for establishment of sockets and the step of transmitting the password and the telecommunication identified number comprises the step of setting up by the monitor computer a socket on the control computer.

77. The method of claim 75 wherein the step of accessing further comprises transmitting by the control computer the visual call status information to the monitor computer via the another network connection of the second network.

78. The method of claim 72 wherein the step of converting comprises the step of determining if the visual call status information should be presented as the audio call status information prior to conversion.

79. The method of claim 78 wherein the step of determining comprises the step of accessing a database which contains information defining which of the visual call status information is to be presented as the audio call status information.

80. A non-transitory computer-readable medium storing computer-executable instructions for:

establishing by a telephone set a network connection via a first network to a control computer of a telecommunication switching system;

transmitting by the control computer visual call status information to the telephone set via the network connection of the first network;

establishing by the monitor computer another network connection via a second network between the control computer and the monitor computer;

accessing by the monitor computer the visual call status information from the control computer via the another network connection of the second network wherein the accessed visual call status information has also been transmitted by the control computer to the telephone set via the network connection of the first network;

converting by a monitor computer the visual call status information to audio call status information; and presenting by a monitor computer the audio call status information to a user of the telephone set.

81. The non-transitory computer-readable medium of claim 80 further stores computer-executable instructions for communicating voice information by the telephone set to another telephone set via the first network.

82. The non-transitory computer-readable medium of claim 81 further stores browser computer-executable instructions for obtaining the computer-executable instructions for establishing, converting, accessing and presenting from a server and storing the obtained computer-executable instructions on the monitor computer.

83. The non-transitory computer-readable medium of claim 80 further stores computer-executable instructions for communicating voice information by the telephone set to another telephone set via the first and second networks wherein the another telephone set communicates both voice information and visual call status information with the telecommunication switching system via the second network.

84. The non-transitory computer-readable medium of claim 83 further stores browser computer-executable instructions for obtaining the computer-executable instructions for establishing, converting, accessing and presenting from a server and storing the obtained computer-executable instructions on the monitor computer.

85. The non-transitory computer-readable medium of claim 80 wherein the computer-executable instructions for accessing via the another network connection of the second network comprise computer-executable instructions for obtaining a password for the telephone set; and transmitting the password and a telecommunication identified number for the telephone set to the control computer by the monitor computer.

86. The non-transitory computer-readable medium of claim 85 wherein the second network supports a protocol that allows for establishment of sockets and the computer-executable instructions for transmitting the password and the telecommunication identified number comprise computer-executable instructions for setting up, by the monitor computer, a socket on the control computer.

87. The non-transitory computer-readable medium of claim 85 wherein the computer-executable instructions for accessing further comprise computer-executable instructions for transmitting by the control computer the visual call status information to the monitor computer via the another network connection of the second network.

88. The non-transitory computer-readable medium of claim 80 wherein the computer-executable instructions for converting comprise computer-executable instructions for determining if the visual call status information should be presented as the audio call status information prior to conversion.

89. The non-transitory computer-readable medium of claim 88 wherein the computer-executable instructions for determining comprises comprise computer-executable instructions for a database which contains information defining which of the visual call status information is to be presented as the audio call status information.

90. The non-transitory computer-readable medium of claim 89 further stores browser computer-executable instructions for obtaining the computer-executable instructions for establishing, converting, accessing and presenting from a server and storing the obtained computer-executable instructions on the monitor computer.

* * * * *